US010580276B2

(12) United States Patent
Mondal et al.

(10) Patent No.: US 10,580,276 B2
(45) Date of Patent: Mar. 3, 2020

(54) SYSTEM AND METHOD FOR AUTOMATIC TOOL TRACKING, MONITORING, AND INVENTORY MANAGEMENT

(71) Applicant: Recon Dynamics, LLC, Bothell, WA (US)

(72) Inventors: Indrasis Mondal, Kirkland, WA (US); K. Deric Eldredge, West Jordan, UT (US); Marty J. Feuerstein, Woodinville, WA (US); Adrian M. Yip, Snohomish, WA (US); Salil P. Banerjee, Kirkland, WA (US); Toby J. Champion, Bainbridge Island, WA (US); Gary W. Amundson, Everett, WA (US)

(73) Assignee: Recon Dynamics, LLC, Bothell, WA (US)

( * ) Notice: Subject to any disclaimer, the term of this patent is extended or adjusted under 35 U.S.C. 154(b) by 0 days.

(21) Appl. No.: 16/007,351

(22) Filed: Jun. 13, 2018

(65) Prior Publication Data
US 2018/0293862 A1  Oct. 11, 2018

Related U.S. Application Data

(63) Continuation of application No. 15/624,249, filed on Jun. 15, 2017, which is a continuation of application (Continued)

(51) Int. Cl.
*G06Q 10/08* (2012.01)
*G08B 13/24* (2006.01)
(Continued)

(52) U.S. Cl.
CPC ........ *G08B 13/2462* (2013.01); *H04W 4/029* (2018.02); *G08B 21/0261* (2013.01);
(Continued)

(58) Field of Classification Search
CPC ..................................................... G08B 13/14
See application file for complete search history.

(56) References Cited

U.S. PATENT DOCUMENTS 6,915,952 B1   7/2005 Allen
7,928,845 B1   4/2011 LaRosa
(Continued)

*Primary Examiner* — Joseph H Feild
*Assistant Examiner* — Pameshanand Mahase
(74) *Attorney, Agent, or Firm* — Davis Wright Tremaine LLP; Michael J. Donohue

(57) ABSTRACT

Systems and methods for automatically tracking tools and managing tool inventory. Tools may be assigned to a work group or crew. Tools are tracked and monitored to determine whether the tools are with their assigned group, relocated to a different group, missing, or left behind at a job site. For relocated tools, the tool tracking system may identify and output the time and the group to which the tool has been relocated. For tools that are missing, the system may compute and output the group or crew, time, and location in the form of a street address, latitude, longitude, and/or map where the missing tool was last seen. The system may also send out real-time notifications (e.g., SMS text messages, emails, phone calls) to designated personnel so that an appropriate action can be taken. The tool tracking system also acts as an inventory management system for tools.

22 Claims, 5 Drawing Sheets

Related U.S. Application Data

No. 15/339,655, filed on Oct. 31, 2016, which is a continuation of application No. 14/047,900, filed on Oct. 7, 2013.

(51) Int. Cl.
*H04W 4/029* (2018.01)
*H04W 84/10* (2009.01)
*H04W 4/80* (2018.01)
*G08B 21/02* (2006.01)

(52) U.S. Cl.
CPC .......... *G08B 21/0275* (2013.01); *H04W 4/80* (2018.02); *H04W 84/10* (2013.01)

(56) References Cited

U.S. PATENT DOCUMENTS

| | | | |
|---|---|---|---|
| 8,159,345 B2 | 4/2012 | Stevens | |
| 2004/0008114 A1* | 1/2004 | Sawyer | G01S 7/003 340/572.1 |
| 2004/0140362 A1 | 7/2004 | Allen | |
| 2004/0236752 A1 | 11/2004 | Han | |
| 2006/0206235 A1* | 9/2006 | Shakes | G06Q 10/08 700/216 |
| 2006/0238161 A1* | 10/2006 | Rusnell | E21B 47/124 320/107 |
| 2007/0073890 A1* | 3/2007 | Ritter | G06Q 10/06 709/229 |
| 2008/0030322 A1 | 2/2008 | Stauffer | |
| 2010/0039513 A1* | 2/2010 | Glickman | G06K 9/00 348/143 |
| 2011/0298619 A1* | 12/2011 | O'Hare | A01K 11/008 340/573.1 |
| 2012/0075072 A1 | 3/2012 | Pappu | |
| 2013/0109375 A1 | 5/2013 | Zeller | |
| 2014/0062700 A1* | 3/2014 | Heine | G08B 13/2462 340/572.1 |
| 2014/0241837 A1* | 8/2014 | Bartelet | B65G 1/10 414/277 |

* cited by examiner

SYSTEM AND METHOD FOR AUTOMATIC TOOL TRACKING, MONITORING, AND INVENTORY MANAGEMENT

RELATED APPLICATIONS

This application is a continuation of U.S. patent application Ser. No. 15/624,249 filed on Jun. 15, 2017, which is a continuation of U.S. patent application Ser. No. 15/339,655 filed on Oct. 31, 2016, which is a continuation of U.S. patent application Ser. No. 14/047,900 filed on Oct. 7, 2013, the entire disclosure and content of which are hereby incorporated by reference in their entirety.

BACKGROUND

Tools, including hand tools and power tools, are extensively used at construction sites or other locations. Tools belonging to one or more entities (e.g., a construction company, a public utility, etc.) may be stored at a distribution center and then used by one or more work groups or crews at various locations. Frequently, tools can be misplaced or lost. Tools can also be stolen by an unauthorized person and removed from a particular location. Misplaced and lost tools are a significant problem for several industries, such as public utilities, construction, and manufacturing. Lost tools reduce efficiency and productivity. Further, replacing lost tools is costly.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems and methods for automatically tracking tools and managing tool inventory. The systems and methods disclosed herein automatically or manually assign tools to a work group or "crew," track tools, and monitor whether the tools are with their assigned group or crew, relocated to a different group or crew, missing, or left behind at a location such as a job site. For relocated tools, the system may identify and output the time and the group to which the tool has been relocated. For tools that are missing or left behind at a job site, the system may compute and output the group or crew, time and location in the form of a street address, latitude, longitude, and/or a map where the missing tool was last seen. The system may also send out notifications (e.g., short message service (SMS) text messages, emails, and/or phone calls) in real-time with the above-referenced information to designated personnel so that an action can be taken immediately. This dramatically reduces the time spent looking for lost or missing tools and significantly reduces the costs incurred due to missing tools. As discussed in more detail below, the system may also be configured to generate automatic alerts, such as geofencing alerts, environmental conditions alerts, tampering alerts, etc.

In some embodiments, the system also acts as an inventory management system for tools, wherein the status and whereabouts of a tool may be identified via a software user interface accessible on various computing devices. The system may allow users to schedule important events for tools such as calibrations, inspections, maintenance, repair, etc., and the system may automatically send out reminders before the event. In some embodiments the reminders are sent through SMS text message, email, phone, etc., to designated personnel.

In some embodiments, the system assists in planning smart and efficient routing of tools and crew from one job site to another. For example, if a crew at a job site requires a specific tool, an operator or member of the crew may log into the system through a computing device, such as a smartphone, tablet, or laptop, and may locate the crew or job site where the required tool can be borrowed. The system may also allow an operator to plan and optimize the route of a crew visiting multiple job sites by minimizing the travel distance and time.

Figure 1:
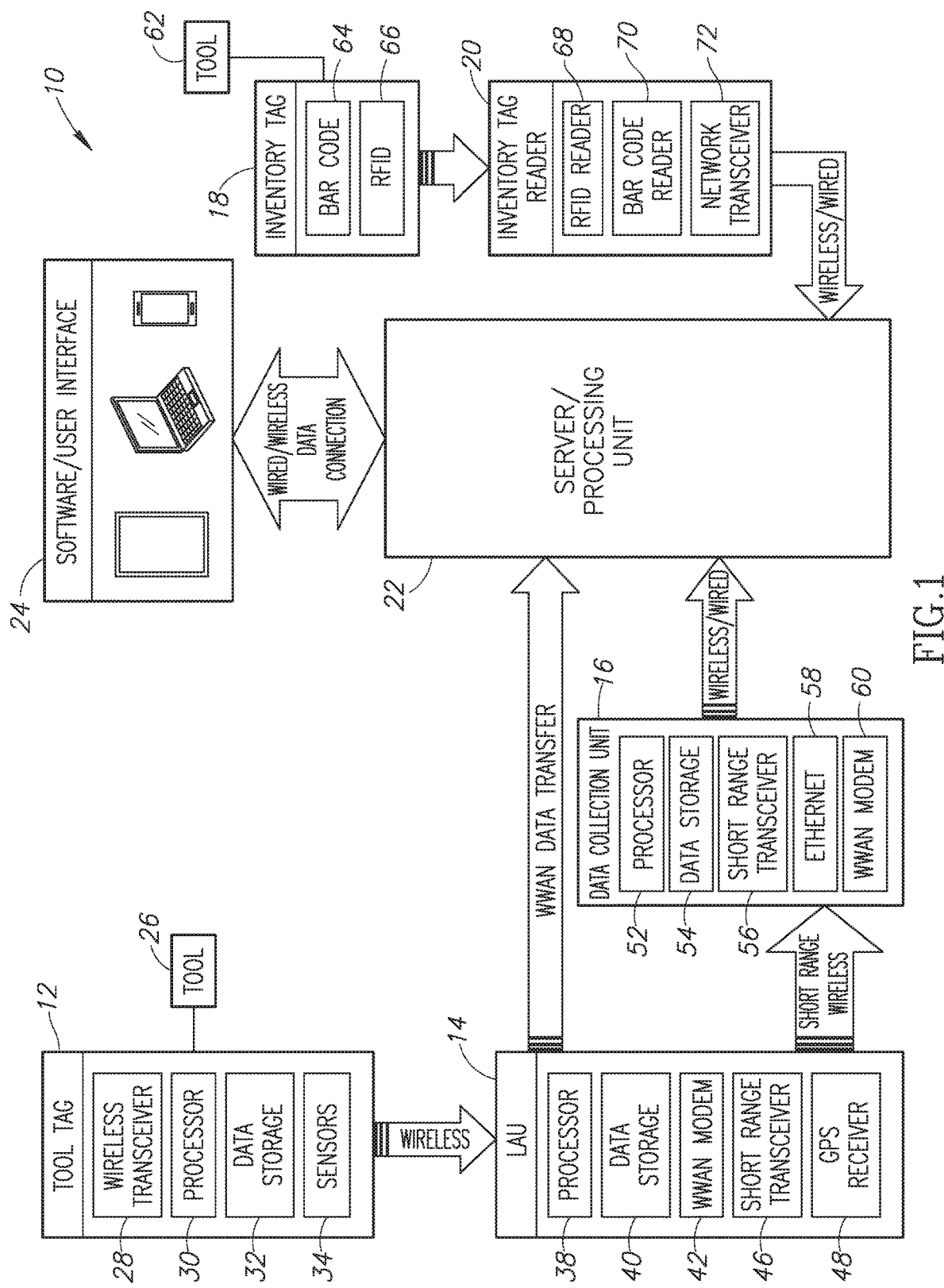
FIG. 1 illustrates a block diagram of a tool tracking system according to an embodiment.

FIG. 1 illustrates a block diagram of a tool tracking system 10 according to an embodiment. The tool tracking system 10 includes seven main components: a tool tag 12, a data and location acquisition/communication unit ("LAU") 14, a data collection unit 16, an inventory tag 18, an inventory tag reader 20, a server computing device or processing unit ("server") 22, and a software user interface 24. Each of these components is described in further detail below with reference to FIGS. 1, 2 and 3. FIG. 3 illustrates an environment in which the tool tracking system 10 shown in FIG. 1 may be implemented.

Generally, the tool tag 12 is a small, low power radio tag that is attachable to or positioned within a tool 26 that is to be tracked and monitored. As shown in FIG. 3, the tool tracking system 10 may include tool tags 12 for each of the tools 26 that are tracked by the tool tracking system. Thus, the tool tag 12 shown in FIG. 1 is representative of a single tool tag. The tool tag 12 includes a short range wireless transceiver 28, a processor 30, data storage device 32, and one or more sensors 34. The processor 30 is generally responsible for executing computer programs stored on the data storage device 32, which may include one or more types of volatile (RAM) memory and non-volatile (ROM) memory. The wireless transceiver 28 of the tool tag 12 may include one or more short range wireless network transceivers, such as but not limited to Bluetooth®, LE Bluetooth® or ZigBee® transceivers.

The sensors 34 may include one or more accelerometer/motion sensors, gyroscopes, magnetometers, temperature sensors, pressure sensors, optical sensors, sonic or ultrasonic sensors, or other sensors. The sensors 34 are configured to gather information relating to the environment in which the tool 26 associated with the tool tag 12 is located or used. For example, the sensors 34 may include a motion sensor operative to determine whether the tool 26 is currently in use, traveling in a vehicle, stationary, etc. The number and type of sensors 34 may depend on the characteristics of the tool 26 to which the tool tag 12 is attached. For example, more expensive tools 26 may be equipped with tool tags 12 having more sensors 34 than less expensive tools. As another example, tools 26 only suitable for operating in certain environments (e.g., certain temperature ranges) may include a sensor 34 (e.g., a temperature sensor) that are operative to detect those operating environments. In general, the tool tag 12 is configured to be small in size and to have a long battery life, for example, in the range of several years.

The tool tag 12 is configured to transmit radio messages via the short range wireless transceiver 28 that include a tag identification (ID) and sensor data at regular intervals to be received by the LAU 14. As shown in FIG. 3, the tool tracking system 10 may include multiple LAUs 14 (e.g., LAU-A and LAU-B) located in various vehicles 36 or positioned at various locations proximate to where tools 26 are used, including but not limited to job sites, distribution centers, and repair centers. In FIG. 3, the LAU-A is positioned in a truck 36A and the LAU-B is positioned in a different truck 36B. The trucks 36A and 36B are representative of vehicles associated with the tool tracking system 10, sometimes generally referred to herein as "trucks 36." After each transmission of a tool tag message, the tool tag 12 may wait to receive an acknowledgment from the LAU 14. If the tool tag 12 does not receive an acknowledgment, it may retransmit the message with a higher power. If the tool tag 12 still does not receive an acknowledgment, the tool tag may continue to increase the power up to a maximum power to improve the likelihood that it will be able to communicate with the LAU 14. If no acknowledgment is received after the tool tag 12 has transmitted at the maximum power setting, the tool tag 12 may then switch into a "lost mode." In the lost mode, the tool tag 12 may transmit a "lost" status message at the highest power. If any LAU 14 receives the lost mode message, the receiving LAU 14 may forward the message to the server 22, which may generate one or more actionable alerts that are sent out to user computing devices associated with designated personnel.

In some embodiments, the tool tag 12 also automatically controls regular transmission intervals based on the usage of the tool 26 or equipment (generally referred to herein as "tool") to which the tool tag is attached. The tool tag 12 may intelligently determine whether the tool 26 is being used by utilizing and/or combining the output from one or more of the sensors 34 such as, an accelerometer, a gyroscope, a magnetometer, a temperature sensor, a pressure sensor, optical sensors, and the like. If the tool tag 12 determines that the tool 26 is not being used, in some embodiments the tool tag may increase the time interval between transmissions to save battery life.

The tool tag 12 may be assigned to one or multiple LAUs 14 associated with the tool tracking system 10. For clarity, a single LAU 14 is shown in FIG. 1 and two LAUs (LAU-A and LAU-B) are shown in FIG. 3. Referring to FIG. 1, in some embodiments the LAU 14 has four primary functions: acquire or receive tool tag messages (including sensor data) from the tool tags 12; send acknowledgments to tool tags upon receiving a tag message therefrom; acquire location information that may be used to determine the location of tool tags 12; and communicate the tool tag and location information to the data collection unit 16 or to the server 22.

The LAU 14 may include, but is not limited to, one or more processors 38 generally responsible for executing computer programs stored on a data storage device 40 of the LAU. The LAU 14 may also include a wireless wide area network (WWAN) modem 42 for transmitting and receiving data content (e.g., such as content received from the tool tag 12 and delivered to the server 22) over a data communication network 44 (see FIG. 3). The data communication network 44 may include a cellular network and/or the Internet, as well as one or more other wired or wireless networks.

The LAU 14 may also include a short range transceiver 46 (e.g., a Bluetooth®, Wi-Fi®, LE Bluetooth®, and/or Zig-Bee® enabled communications transceiver) that allows the LAU to wirelessly communicate with one or more electronic devices. In some embodiments, one or more LAUs 14 of the tool tracking system 10 may only include the short range transceiver 46 while others may include both the short range transceiver and the WWAN modem 42. The LAU 14 further includes a global positioning system (GPS) receiver 48 or other device operative to determine the location of the LAU 14. As shown in FIG. 3, using the GPS receiver 48, the LAU-A and LAU-B may obtain location information by receiving signals from GPS satellites 50. Since the tool tags 12 communicate with the LAUs 14 using short range communication, the location of the LAU that receives a communication from a tool tag is indicative of the location of that tool tag. As can be appreciated, the location of the tool tags 12 can therefore be determined without requiring each tool tag to include expensive and bulky location determination devices (e.g., GPS receivers).

Generally, each LAU 14 may be assigned to a truck, crew, job site, depot, repair center, distribution center, etc. ("group"). In operation, the LAU 14 continuously listens for radio tool tag messages received from tool tags 12 that are each attached to one of the tools 26 (see FIG. 3). When the LAU receives a tool tag message, it may send an acknowledgment message to the tool tag that sent the message, as discussed above. The LAU 14 collects and stores the messages it receives from the tool tags 12 for a predefined interval. At the end of the interval, the LAU 14 packages the messages received from the tool tags 12 along with the GPS location information from the GPS receiver 48 and sends the data either to the data collection unit 16 positioned nearby (e.g., at a job site) via a short range wireless link using the short range transceiver 46 or to the server 22 using the WWAN modem 42. In a situation where the LAU 14 cannot establish a link to the server 22 or the data collection unit 16, the LAU may relay the data to a nearby LAU (e.g., from LAU-A to LAU-B shown in FIG. 3) located in a different truck or located somewhere else in the job site to be forwarded by that LAU 14 to the server 22. Additionally or alternatively, the LAU 14 may store the data until it is able to transmit the data to the data collection unit 16 or to the server 22.

The tool tracking system 10 may include numerous data collection units 16, although only a single data collection unit is shown in FIGS. 1 and 3 for clarity. The data collection unit 16 is operative to collect data from all the LAUs 14 that are within range through short range wireless links and then forward the received data to the server 22 through wired or wireless communication over the data communications network 44 (e.g., the Internet). For example, a single data collection unit 16 may be positioned at a job site to receive data from multiple LAUs 14 that are also positioned at the job site (e.g., LAUs attached to trucks 36 that travel to the job site).

As shown in FIG. 1, the data collection unit 16 includes a processor 52 responsible for executing computer programs stored in a data storage device 54 of the data collection unit.

The data collection unit 16 further includes a short range transceiver 56 configured to implement one or more short range wireless communication protocols (e.g., Wi-Fi®, Zig-Bee®, Bluetooth®, LE Bluetooth®, or the like). The data collection unit 16 may also include a WWAN modem 60 for transmitting and receiving data content (e.g., such as content received from the LAU 14 and delivered to the server 22) over the data communication network 44 (see FIG. 3). In some embodiments, the data collection unit 16 further includes an Ethernet interface 58 or its equivalent to facilitate wired network communication with the server 22. The data collection unit 16 may be installed at a job site, depot, repair center, and/or a distribution center. The tool tracking system 10 may include a plurality of data collection units 16 each distributed at various locations.

Referring to FIG. 1, the inventory tag 18 is a small tag that is attachable to a tool 62 that is generally not meant to be tracked in any way other than for inventory purposes. The tool tracking system 10 may include numerous inventory tags 18, each associated with a particular tool 62. The inventory tag 18 includes a radio frequency identification (RFID) chip 64 and/or a barcode 66 and is attached to the tool 62. The inventory tag 18 may include a unique inventory tag ID that is programmed into the RFID chip 64 or into the barcode 66. Those skilled in the art will appreciate that the term "barcode" is intended to encompass other forms of printed symbology, such as 2D codes, QR codes, and the like.

The inventory tag reader 20 is operative to read the inventory tag ID of the inventory tag 18 by either reading the programmed ID from the RFID chip 64 using an RFID reader 68 or by reading the ID from the barcode 66 using a barcode reader 70. The inventory tag ID may then be sent to the server 22 using a network transceiver 72 of the inventory tag reader 20 configured to communicate through wired or wireless connection with the server 22.

Figure 2:
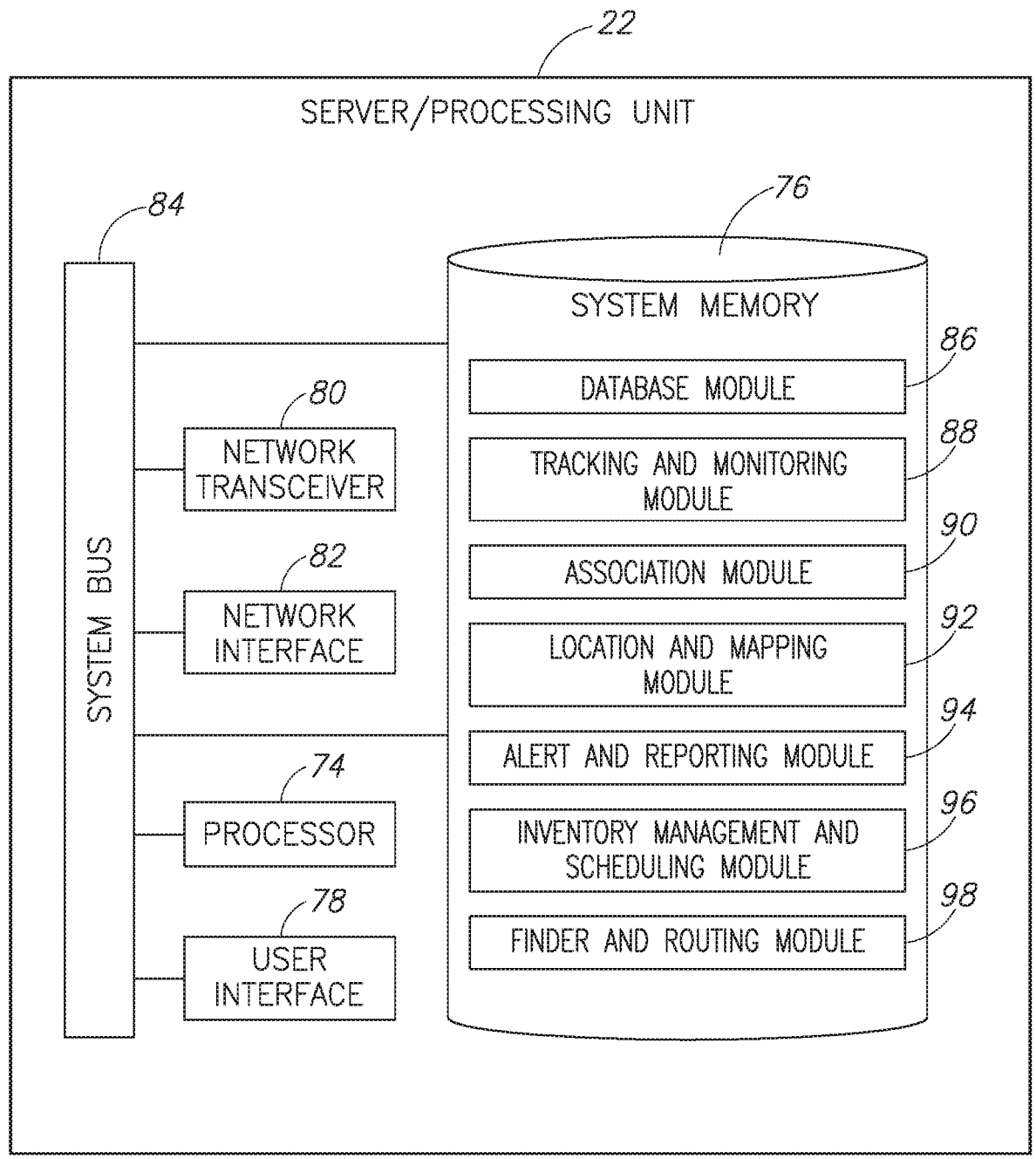
FIG. 2 illustrates a block diagram of a server or processing unit of the tool tracking system of FIG. 1.
Figure 3:
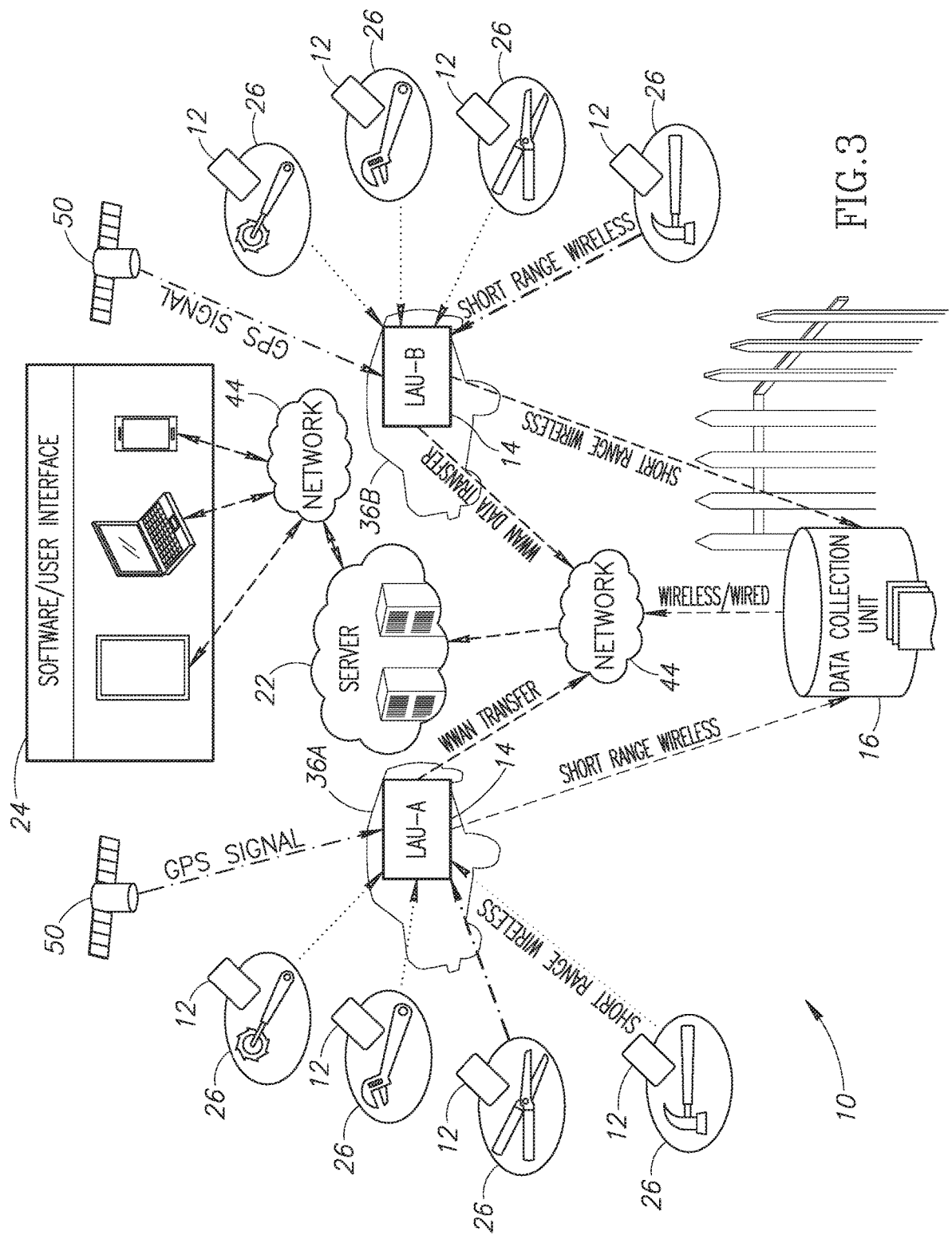
FIG. 3 illustrates an environment in which the tool tracking system of FIG. 1 may operate.

FIG. 2 illustrates a more detailed diagram view of the server 22, which may be located a remote location or in the "cloud." The server 22 may include, but is not limited to, one or more processors 74 generally responsible for executing computer programs stored on the server's system memory 76, which may include volatile (RAM) memory and non-volatile (ROM) memory. The server 22 may also include a user interface 78 that allows a user/administrator to interact with the server's software and hardware resources.

The server 22 may also include a network transceiver 80 and a network interface 82 for transmitting and receiving data content (e.g., such as content received from the LAUs 14, the data collection units 16, or the inventory tag reader 20) over one or more data communication networks 44. The server 22 may also include a system bus 84 that facilitates data communications amongst the hardware resources of the server. As shown in FIG. 2, the system memory 76 includes a data storage structure, such as a database module 86, a tracking and monitoring module 88, an association module 90, a location and mapping module 92, an alert and reporting module 94, an inventory management and scheduling module 96, and a finder and routing module 98. Each of these modules is discussed below.

All the data received from the tool tags 12, LAUs 14, and data collection units 16, along with the location information are stored in the database module 86. In some embodiments, the database module 86 may comprise a NoSQL/SQL database. The database module 86 also holds IDs for tool tags 12, inventory tags 18, LAUs 14, data collection units 16, as well as associated tools 26, trucks 36, crews, job sites, repair centers, etc.

The tracking and monitoring module 88 is generally responsible for tracking and monitoring all tools 26 with tool tags 12 associated therewith and making decisions regarding whether the status of a tool is "OK," "missing," or "relocated" to another truck, crew, job site, depot, repair center, or distribution center. At the end of each reporting interval, the tracking and monitoring module 88 consolidates all the messages it has received in that interval from the LAUs 14. As discussed above, each message from one of the LAUs 14 contains all the messages it has received from the tool tags 12 within a reporting interval. The tracking and monitoring module 88 then decides whether a tool tag 12, and its associated tool 26, is with its assigned group (e.g., truck, crew, job site, depot, repair center, distribution center, etc.), relocated to a different group, left behind at a location such as a job site, or missing.

Figure 4A:
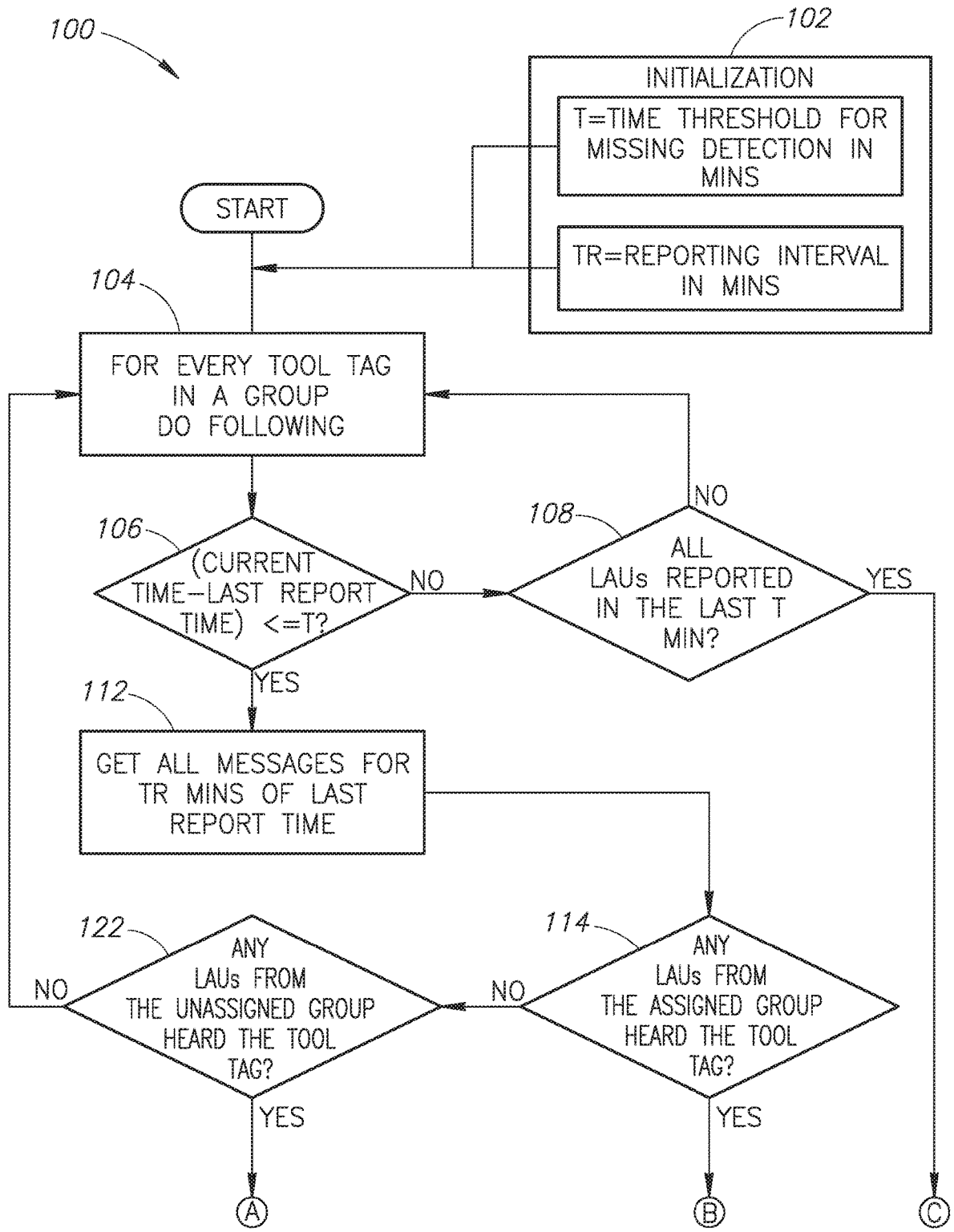
FIG. 4A illustrates a first portion of a flow diagram for a tool tracking and monitoring module of the tool tracking system.
Figure 4B:
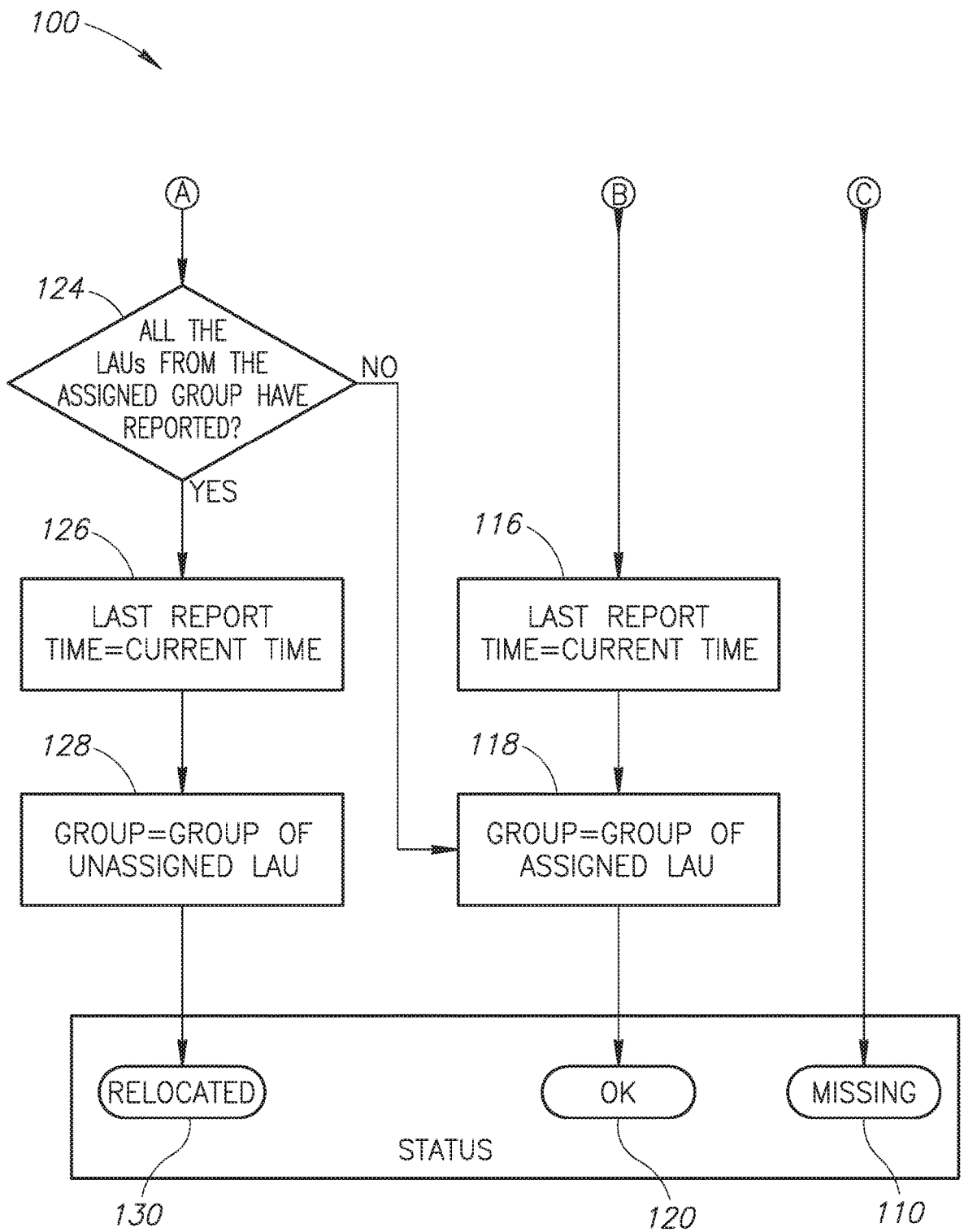
FIG. 4B illustrates a second portion of the flow diagram for the tool tracking and monitoring module of the tool tracking system.

An algorithm the tracking and location module 88 may utilize is illustrated by a flowchart 100 shown in FIGS. 4A and 4B. As discussed above, the tracking and location module 88 of the server 22 receives and consolidates messages it has received from the LAUs 14. The messages include tool tag messages that may include tool tag IDs, sensor data, etc. Initially, at block 102 a user may set a time threshold for missing tools detection (e.g., T minutes) and a reporting interval (e.g., TR minutes). Then, for each tool in a particular group to which it has been assigned, the tracking and reporting module 88 may determine if the tool tag associated with the tool has not reported in (via tool tag messages send to LAUs 14) in more than the threshold for missing detection time (T), blocks 104 and 106. If the tool has not reported in and all the LAUs 14 have sent in their messages within the threshold for missing tools detection time T, the tool is assigned a status of "lost," blocks 108 and 110 (see FIG. 4B).

If the tool has reported in within the threshold for missing tools detection time (T) (block 106="yes"), the tracking and location module 88 collects all messages from the LAUs 14 within the reporting interval (TR), block 112. At decision block 114, if any of the LAUs 14 associated with the group to which the tool tag (and tool) is assigned ("assigned LAUs") have heard from the tool tag within the reporting interval (TR) (block 114="yes"), the last report time for the tool tag is set as the current time (block 116), the group for the tool tag remains set to the assigned LAU (block 118), and the status for the tool is set to "OK," block 120.

If any of the assigned LAUs 14 have not heard from the tool tag within the reporting interval (block 114="no"), the tracking and location module 88 next checks to see whether any of the LAUs from a group to which the tool is not assigned ("unassigned LAUs") have heard from the tool tag within the reporting interval (TR), block 122. If so, the tracking and location module 88 first checks to make sure all the assigned LAUs 14 have reported in during the reporting interval, block 124. If all the assigned LAUs 14 have reported in, meaning only an unassigned LAU heard from the tool tag in the last reporting interval (TR), then the last report time for the tool tag is set as the current time (block 126), the group for the tool tag is reassigned to the group to which the LAU that heard from the tool tag is assigned (block 128), and the status for the tool tag is set to "relocated," block 130.

Referring back to FIG. 2, the association module 90 is responsible for the automatic assignment and reassignment of tools 26 to groups (e.g., trucks, crews, job sites, depots, repair centers and distribution centers). In some embodiments, the automatic assignment and reassignment of the tools 26 may be performed based on the logic described below.

Initially, the tools 26 may be assigned to distribution centers. Whenever one of the tools 26 gets relocated to a group such as a truck, crew, job site, depot, or repair center from a distribution center, it automatically is associated with that group. Similarly, whenever one of the tools 26 is relocated to a distribution center from a group, it is automatically associated with that distribution center. If one of the tools 26 is relocated to a group from a couriering/dispatching truck, which is a special vehicle that is used for couriering or dispatching tools among yards, distribution centers, job sites, and repair centers, the tool automatically gets associated to that group. If one of the tools 26 is relocated to a courier/dispatching truck from a group, the tool automatically is associated to that courier/dispatching truck.

In some embodiments, whenever a tool is relocated to a new group from another group, the association module 90 may not automatically reassign the tool. Instead, a user or operator may be presented with an option in the user interface 24 (discussed below) to accept or reject the assignment of the tool to the new group. For example, the association module 90 of the tool tracking system 10 may allow a user to enable an "automatic association mode" for one or more selected groups. The user can enable this feature from the user interface 24 (see FIG. 1). When the automatic association mode is enabled for a particular group, any tool that is determined to have been relocated to that group is automatically reassigned to the group without requiring selection or approval by a user. In some embodiments, the tool tracking system 10 may also allow tools to be associated using RFID or barcode scanning. Moreover, at any point in time, a user may also manually assign or reassign a tool to any group using the user interface 24 shown in FIG. 1, which is accessible via a suitable user computing device. If a group is in a "manual association mode," a tool that is determined to have been relocated to a new group is reassigned to the group only after notification to and approval by a user.

The location and mapping module 92 shown in FIG. 2 is now described. As discussed above, each LAU 14 may have a GPS receiver 48. Each time one of the LAUs 14 receives a tool tag message from a tool tag 12, it attaches the time and the location coordinates (e.g., latitude, longitude, and elevation) with the message. Since the tool tags 12 communicate with the LAUs 14 via short range wireless communication, the location of the LAU that receives a message from a tool tag is approximately the location of the tool tag and associated tool 26. The location and mapping module 92 utilizes this information to determine when and where a tool 26, truck, or crew was last seen. The location and mapping module 92 also uses the location coordinates to map the objects to the closest physical address (e.g., a street address). This information is then available via the user interface 24 where the location coordinates may be displayed on a map along with the determined physical address.

The alert and reporting module 94 is generally responsible for generating and reporting alerts including, but not limited to, missing and relocated tool alerts, geofencing alerts, environmental alerts, and security alerts.

If one of the tools 26 has been missing or has been relocated for a certain time threshold set by a user (e.g., threshold T discussed above with reference to FIGS. 4A and 4B), the alert and reporting module 94 may generate a missing or relocated tool alert and send the alert to interested users. The alerts may be sent by email, SMS text message, phone call, and the like, so that urgent action may be taken. The alert and reporting module 94 may send the time and location information relating to when the tool 26 was last seen. Further, if the alert and reporting module 94 receives a message from a tool that is transmitting in lost mode, the alert and reporting module may generate and send an immediate alert along with the received location information.

In some embodiments, the tool 26 may be assigned to be used only at specified geographical areas. In this geofencing application, an alert may be generated and sent if the tool 26 is moved out of the specified area. The specified geographic area may be static or may be selectively modified by users or administrators of the tool tracking system 10.

In some embodiments, the tool 26 may be assigned to be used under certain environmental conditions, such as certain temperatures and/or pressures. If the environmental condition of the tool 26 exceeds the assigned environmental thresholds, an environmental alert may be generated and sent as discussed above. The environmental conditions of the tool 26 may be monitored using the one or more sensors 34 shown in FIG. 1.

In some embodiments, the tool 26 may be assigned to be used within certain hours of the day. If the tool 26 is used or tampered with outside of the specified hours (e.g., during a restricted period), an alert may be generated and sent. The restricted period may be scheduled automatically (e.g., based on a work schedule, etc.) or may be scheduled manually as needed. As discussed above, use of the tool 26 may be detected by one or more sensors 34 of the tool tag 12.

The inventory management and scheduling module 96 is generally responsible for managing inventory of tools 26 and for scheduling maintenance, inspection, calibration, repair, or the like for tools, equipment, and/or trucks. The inventory management and scheduling module 96 may manage inventory various levels including truck, crew, job site, depot, repair center, distribution center, and organization levels. A user of the tool tracking system 10 may allocate a tool 26 or group of tools to a specific truck 36, crew or a job site, and upon return of the tools take an inventory to see if all the items have been returned. A user may also schedule a time for an action to be taken in the future, such as maintenance, inspection, calibration, repair, or the like, and the inventory management and scheduling module may automatically generate a reminder and send the reminder to the interested users.

The finder and routing module 98 may be used to find or locate tools 26, trucks 36, or crews. In the case of the tool 26, the finder and router module 98 may determine with which truck or crew the tool is located (e.g., address and location coordinates). In the case of the truck 36 or the tool 26, the finder and routing module 98 may determine its current location coordinates and physical address. If a new tool is needed at a job site, the finder and routing module 98 may first find tools 26 that are available among all crews, trucks, job site and depots, or a selected subset thereof, and then determine which of the available tools would be most efficient to route to the requesting job site.

If a truck or a crew is needed at a job site, the finder and routing module 98 may first locate the available trucks and crews that are either close by or scheduled to be near or to pass by the job site where the truck or crew is needed. The finder and routing module 98 may then determine which truck or crew will be the most efficient to route to the job site by optimizing availability, traffic, scheduling, and distance.

A user of the tool tracking system 10 can access the system using the user interface 24. The user interface 24 may be a web application that can be accessed from anywhere using any Internet enabled computing device (e.g., a laptop, smartphone, etc.), or a dedicated application for a smartphone, tablet, laptop, desktop computer, or other computing device.

The user interface 24 is operative to display the status of all the tools 26 and crews associated with the tool tracking system 10. For each tool 26, the user interface 24 may display a map with the location, addresses and the time when the tool was last seen or relocated. For every truck 36 and crew, the user interface 24 may display a map with the current location, physical address, and time.

As discussed above, the user interface 24 allows the user to enable association of tools 26 with a group. The user may accept or reject reassignment of tools 26 to a new group (e.g., a new truck, crew, etc.). The user interface 24 allows users to view and manage inventory for trucks 36, crews, job sites, depots, repair centers, distribution centers, and the overall organizational level. Users can also find and route tools 26, trucks 36, and crews to job sites. The user interface 24 also allows users to schedule maintenance, repair, calibration, repair date, etc. for tools 26 and trucks 36.

The user interface 24 also allows users to configure the type and recipient of various alerts that may be sent by the alert and reporting module 94 of the server 22 (see FIG. 2). Different recipients may receive different types of alerts depending on the recipients' position, work schedule, current location, preferences, etc. For example, one user may only receive alerts during the hours of 8:00 a.m. and 5:00 p.m. via SMS text message, whereas another user may receive alerts 24 hours a day via SMS text message, email, and phone calls. As another example, in the case where one of the tools 26 has been left at a job site, a driver of a truck 36 that has just left the job site may receive an alert indicating the tool was left behind. In some embodiments, the user interface 24 also allows users to create reports, charts, plots, etc. of status, usage and performance information relating to tools, trucks, crews, etc.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A tool tracking system for tracking a tool, comprising:
   a tool tag attachable to a tool and comprising a wireless transceiver configured for short range wireless communication, the tool tag configured to automatically transmit, at periodic intervals, via the wireless transceiver, a tool tag message comprising a tool tag identification (ID);
   a location and acquisition/communication unit (LAU) and a location determination device, the LAU being positionable at a location within range of the wireless transceiver of the tool tag, the LAU being configured to receive the tool tag message from the tool tag transceiver, and further configured to obtain location data from the location determination device and to associate the obtained location data with the received tool tag message, the LAU being further configured to send the tool tag message and the associated location data via a network;
   at least one sensor operationally coupled to the tool and configured to determine that the tool is in use, sensor data generated by the sensor being transmitted at the periodic intervals with the tool tag ID; and
   a server computing device coupled to the network and operative to receive the tool tag message and the associated location data from the LAU using the server network interface to track the location of the tool to which the tool tag is attached.

2. The tool tracking system of claim 1, further comprising an association module configured to assign the tool with the tool tag attached thereto to a first croup wherein the association module is further configured to reassign the tool with the tool tag attached thereto to a second group different than the first group.

3. The tool tracking system of claim 2, wherein the association module is configured to, prior to reassigning the tool from the first group to the second group, transmit to a user computing device associated with a user via the network interface of the server a request for permission to reassign the tool, and to receive a response from the computer granting permission to reassign the tool.

4. The tool tracking system of claim 2, wherein the server computing device further comprises a tracking and monitoring module operative to receive a plurality of messages from the LAU and, based on the received messages, to determine a status of the tool indicative of whether the tool is located with the first group, whether the tool has been relocated to a second group different than the first group, or whether the tool has been lost.

5. The tool tracking system of claim 1, further comprising an alert and reporting module operative to send a timely notification, indicative of the location of the tool, to a user computing device associated with a user.

6. The tool tracking system of claim 5, wherein the alert and reporting module is operative to establish a restricted period for the tool wherein the tool is not to be used, to monitor use of the tool, and to send a timely notification to a user computing device associated with a user when the alert and reporting module detects the tool being used during the restricted period.

7. The tool tracking system of claim 6, wherein the alert and reporting module is operative to automatically establish the restricted period based upon a work schedule of a user of the tool.

8. The tool tracking system of claim 1, further comprising a location and mapping module operative to utilize the received location data to determine location information for the tool and to transmit the location information to a user computing device associated with a user via the network interface of the server computing device.

9. The tool tracking system of claim 1, wherein the server computing device comprises a finder and routing module operative to receive a request for the tool from a user computing device associated with a user via the network interface of the server computing device, and to transmit instructions that cause the tool to be routed according to the request.

10. The tool tracking system of claim 1, wherein the tool tag further comprises a sensor operative to sense an environmental condition associated with the tool, the sensor being selected from a group of sensors comprising a motion sensor, a temperature sensor, a pressure sensor, an optical sensor, a sonic sensor, an ultrasonic sensor, a magnetometer, an accelerometer, and a gyroscope.

11. The system of claim 1, wherein tool use information from the tool use sensor is used to determine a maintenance schedule for the tool.

12. A computer-implemented method for tracking and monitoring tools, comprising:
  under the control of one or more computer systems configured with executable instructions,
  using a sensor coupled to the tool to determine that the tool is in use and to generate tool use information;
  receiving tool tag messages at a location and acquisition/communication unit (LAU) using short range wireless communication automatically transmitted, at periodic intervals, from a plurality of tool tags each associated with one of the tools, the tool tag messages each including a tool tag identification (ID) and tool use information from the sensor;
  obtaining location information indicative of a present location of the LAU;
  associating the received tool tag IDs with the location information; and
  sending the tool tag IDs and the associated location information and tool use information from the LAU to a server computing device over a network.

13. The computer-implemented method of claim 12, further comprising:
  assigning each of the tool tag IDs to a group;
  storing the tool tag IDs and the associated location information in a data storage device of the server computing device; and
  determining whether each of the tool tags is located with its assigned group using the received tool tag IDs and location information.

14. The computer-implemented method of claim 13, further comprising sending a timely notification to a user computing device comprising a status of one of the tools associated with one of the tool tags, the status being indicative of whether the tool is located with its assigned group, whether the tool has been relocated to a group different than its assigned group, or whether the location of the tool is unknown.

15. The computer-implemented method of claim 12, wherein at least a subset of the tool tags comprises one or more sensors, and the tool tag messages further include sensor data obtained from the one or more sensors.

16. The computer-implemented method of claim 15, wherein the one or more sensors comprises a motion sensor, temperature sensor, pressure sensor, optical sensor, sonic sensor, ultrasonic sensor, magnetometer, accelerometer, or gyroscope.

17. The computer-implemented method of claim 15 further comprising determining a status of at least one of the tools using the sensor data.

18. The computer-implemented method of claim 15, further comprising establishing a restricted period for the tool wherein the tool is not to be used, monitoring use of the tool, and sending a timely notification to a user computing device associated with a user when the tool is being used during the restricted period.

19. The computer-implemented method of claim 18, wherein monitoring use of the tool comprises evaluating the sensor data.

20. A computer-implemented method for tracking and monitoring tools, comprising:
  under the control of one or more computer systems configured with executable instructions,
  assigning a tool to a first group, the tool having a tool tag attached thereto that is operative to automatically transmit, at periodic intervals, via a wireless transceiver, a tool tag message comprising tool tag identification (ID) data for each respective tool tag;
  using a sensor operationally coupled to the tool to determine that the tool is in use, the sensor generating tool use information that is transmitted as part of the tool tag message;
  receiving tool tag messages and tool use information from the tool tag at a location and acquisition/communication unit (LAU) via a short range transceiver that is in communication with the wireless transceiver;
  obtaining location information indicative of a present location of the LAU;
  associating the received tool tag messages with the location information and tool use information;
  sending the tool tag messages and the associated location information and tool use information from the LAU to a server computing device over a network; and
  determining a status of the tool using the tool tag messages and the associated location information, the status being indicative of whether the tool is located with the first group, whether the tool has been relocated to a group different than the first group, or whether the location of the tool is unknown.

21. The computer-implemented method of claim 19, wherein the tool tag comprises a plurality of sensors and the tool tag messages comprise sensor data, and determining the status of the tool comprises evaluating the sensor data.

22. The system of claim 1, wherein tool use information from the tool use sensor is used to determine a duration of tool use.

\* \* \* \* \*